(12) United States Patent
Matsumoto

(10) Patent No.: US 9,329,454 B2
(45) Date of Patent: May 3, 2016

(54) FOCAL-PLANE SHUTTER, IMAGE-PICKUP APPARATUS, AND IMAGE-PICKUP SYSTEM

(71) Applicant: CANON KABUSHIKI KAISHA, Tokyo (JP)

(72) Inventor: Yoshiyuki Matsumoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 14/017,877

(22) Filed: Sep. 4, 2013

(65) Prior Publication Data

US 2014/0078374 A1 Mar. 20, 2014

(30) Foreign Application Priority Data

Sep. 14, 2012 (JP) ................................ 2012-202603

(51) Int. Cl.
*H04N 5/225* (2006.01)
*G03B 9/26* (2006.01)
*G03B 9/20* (2006.01)
*G03B 9/42* (2006.01)

(52) U.S. Cl.
CPC .. *G03B 9/26* (2013.01); *G03B 9/20* (2013.01); *G03B 9/42* (2013.01); *H04N 5/2254* (2013.01)

(58) Field of Classification Search
CPC .............. G03B 9/26; G03B 9/42; G03B 9/20; H04N 5/2254
See application file for complete search history.

(56) References Cited

U.S. PATENT DOCUMENTS

2012/0128346 A1* 5/2012 Matsumoto ................... 396/493
2012/0219280 A1* 8/2012 Nishimura et al. ........... 396/456

FOREIGN PATENT DOCUMENTS

JP 08-110546 A 4/1996

* cited by examiner

*Primary Examiner* — Twyler Haskins
*Assistant Examiner* — Carramah J Quiett
(74) *Attorney, Agent, or Firm* — Cowan, Liebowitz & Latman, P.C.

(57) ABSTRACT

A focal-plane shutter includes at least one blade group, a shutter base plate where the blade group is rotatably attached, a blade driving member rotatably supported by the shutter base plate and configured to drive the blade group from a standby position to a travelling completed position when taking pictures, a charge member configured to charge the blade driving member and a braking member formed on a first surface opposite to a second surface where the blade driving member of the shutter base plate is rotatably supported and configured to abut against a protruding portion which penetrates the shutter base plate from the blade driving member so as to protrude to the first surface.

12 Claims, 15 Drawing Sheets

SECTION B-B

SECTION A-A

SECTION C-C

SECTION C-C

VIEW D

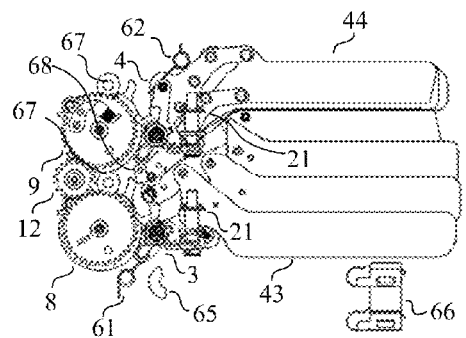 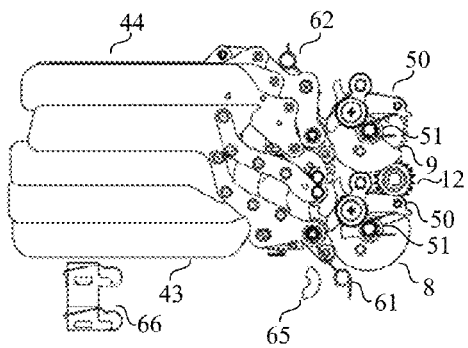
FIG. 9A   FIG. 9B
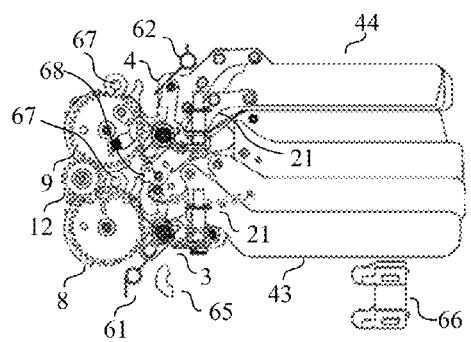 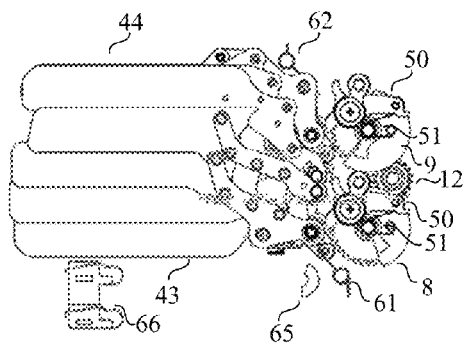
FIG. 10A   FIG. 10B
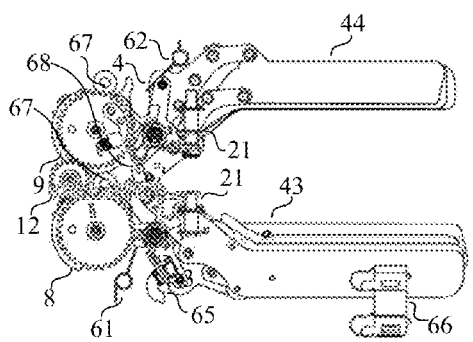 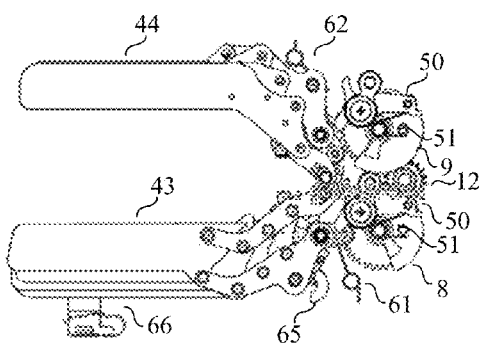
FIG. 11A   FIG. 11B

FOCAL-PLANE SHUTTER, IMAGE-PICKUP APPARATUS, AND IMAGE-PICKUP SYSTEM

BACKGROUND OF THE INVENTION

1. Field of the Invention

The present invention relates to a focal-plane shutter for an image-pickup apparatus.

2. Description of the Related Art

It is known that a slit formed by two pairs of shutter blade groups (leading blade and a trailing blade) continuously exposes an image-pickup surface as a focal-plane shutter for an image-pickup apparatus.

Each shutter blade group is formed by a plurality of arms, blades and pivoting members and reciprocates between a position covering an opening part of a shutter base plate and a position evacuating from the opening part of the shutter base. Additionally, the two pairs of shutter blade group are positioned in a blade room formed by three base plates including the shutter base plate.

Additionally, the shutter blade is controlled by an electric magnet when the shutter blade is operated by a driving member. The driving member bounds at the time of shutdown even if a stopper contacts the driving member since the focal-plane shutter having this configuration is operated at high speed when taking pictures. Additionally, if the stopper contacts the shutter blade, the blade may break. Thus, contraptions such as the driving blade abuts against a braking member urged by a spring (Japanese Patent Laid-Open No. 8-110546) is performed so as to prevent the situation.

However, since the braking member is position between at the blade driving member and the shutter blade plate in Japanese Patent Laid-Open No. 8-110546, an attracting portion such as an electric magnet and an armature is especially susceptible by particles generated at the braking member.

SUMMARY OF THE INVENTION

In view of the foregoing, it is an object of the present invention that a blade driving member is not susceptible by particles generated at a friction brake by positioning a shutter base plate between the friction brake and a blade driving member.

To achieve the object, a focal-plane shutter as one aspect of the present invention includes at least one blade group, a shutter base plate where the blade group is rotatably attached, a blade driving member rotatably supported by the shutter base plate and configured to drive the blade group from a standby position to a travelling completed position when taking pictures, a charge member configured to charge the blade driving member and a braking member formed on a first surface opposite to a second surface where the blade driving member of the shutter base plate is rotatably supported and configured to abut against a protruding portion which penetrates the shutter base plate from the blade driving member so as to protrude to the first surface.

Further features of the present invention will become apparent from the following description of exemplary embodiments with reference to the attached drawings.

BRIEF DESCRIPTION OF THE DRAWINGS

FIG. 9A and FIG. 9B are schematic diagrams of illustrating state transition of the focal-plane shutter.

FIG. 10A and FIG. 10B are schematic diagrams of illustrating state transition of the focal-plane shutter.

FIG. 11A and FIG. 11B are schematic diagrams of illustrating state transition of the focal-plane shutter.

DESCRIPTION OF THE PREFERRED EMBODIMENTS

Exemplary embodiments of the present invention will be described below with reference to the accompanied drawings.

Embodiment 1

Figure 1:
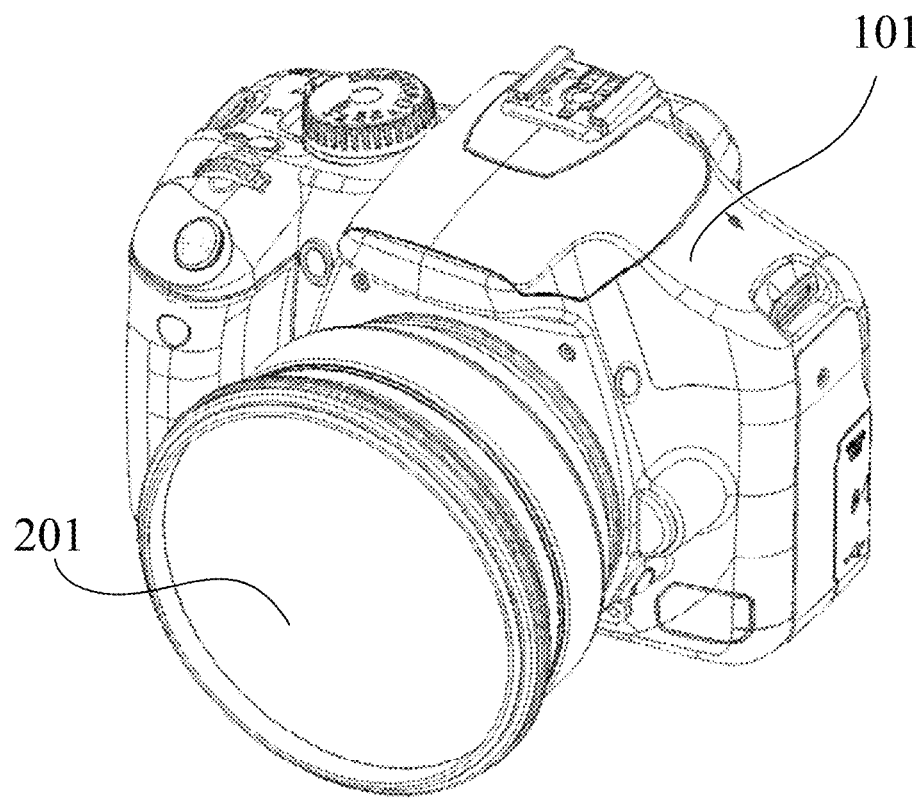
FIG. 1 is an appearance perspective view of an image-pickup apparatus having a focal-plane shutter that is one example of an embodiment of the present invention.

FIG. 1 is an appearance perspective view of an image-pickup apparatus having a focal-plane shutter that is one example of an embodiment of the present invention.

An image-pickup apparatus 101 is a digital camera that photoelectrically converts an object image into image information by an image-pickup element such as a CCD or a CMOS, and records the image information on an electronic recording medium such as an arbitrary memory.

An image-pickup lens 201 detachable from the image-pickup apparatus 101 makes an image-pickup system along with the image-pickup apparatus 101.

Next, the configuration of the focal-plane shutter is described.

Figure 2A:
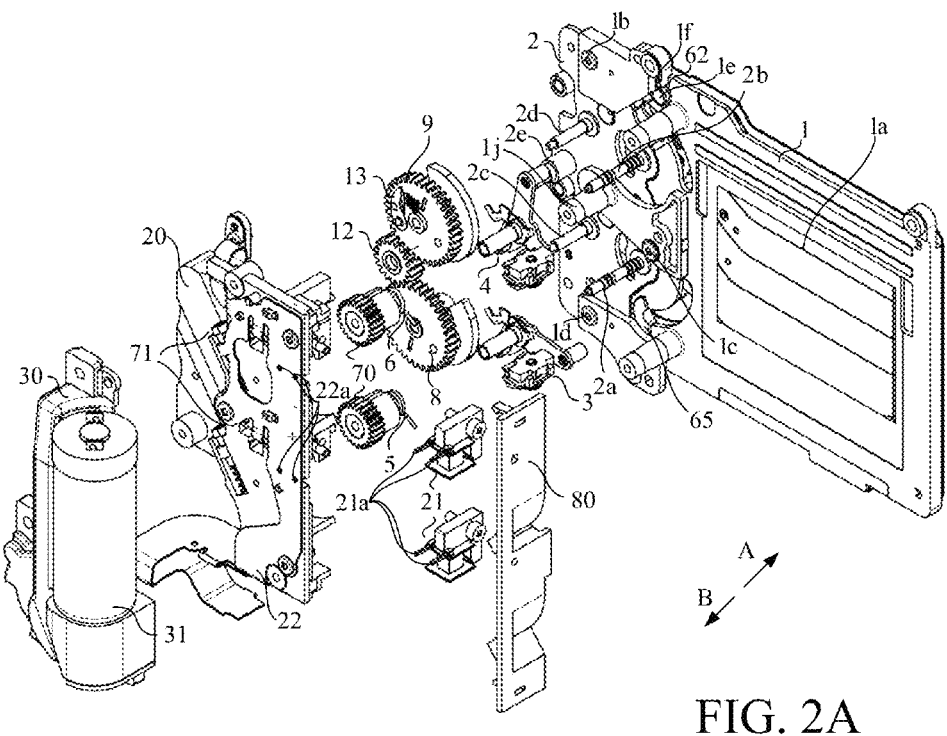
FIG. 2A and FIG. 2B are exploded perspective views of the focal-plane shutter.
Figure 2B:
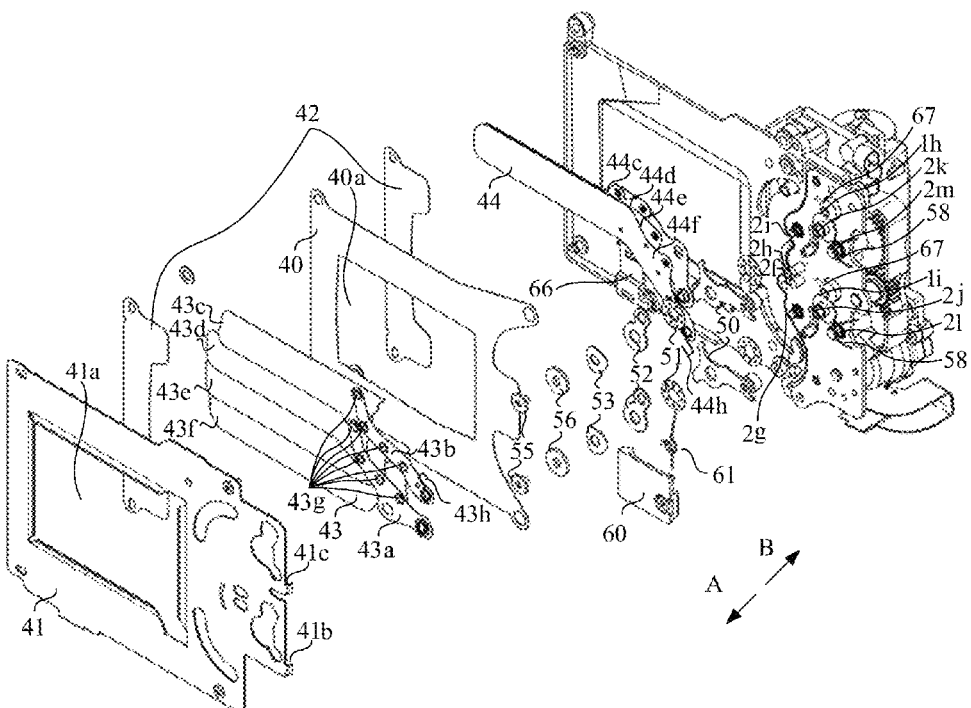

FIG. 2A is an exploded perspective view of the focal-plane shutter as seen from an image-pickup light incident side, and FIG. 2B is an exploded perspective view of the focal-plane shutter as seen from an image-pickup light emission side.

Figure 3A:
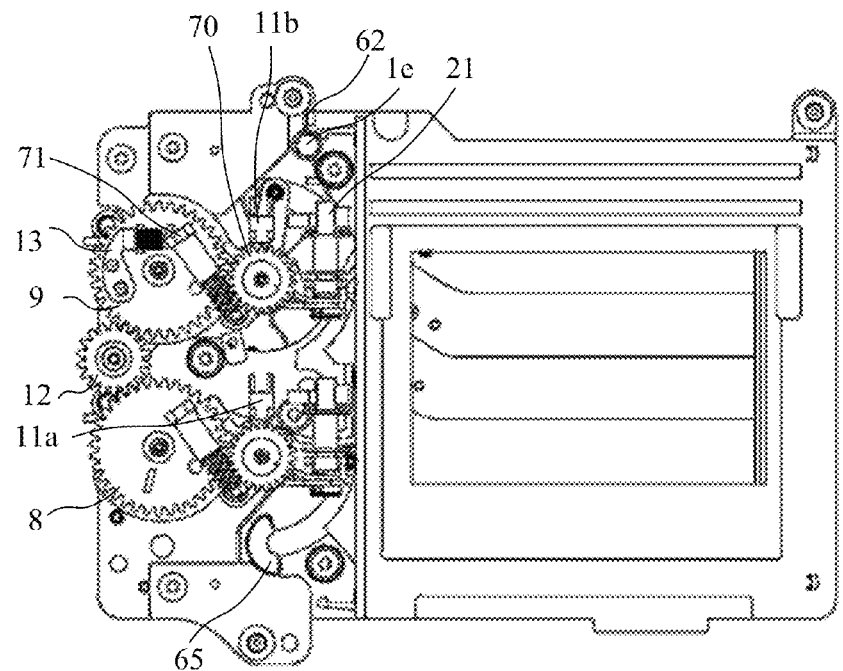
FIG. 3A and FIG. 3B are appearance views of the focal-plane shutter.
Figure 3B:
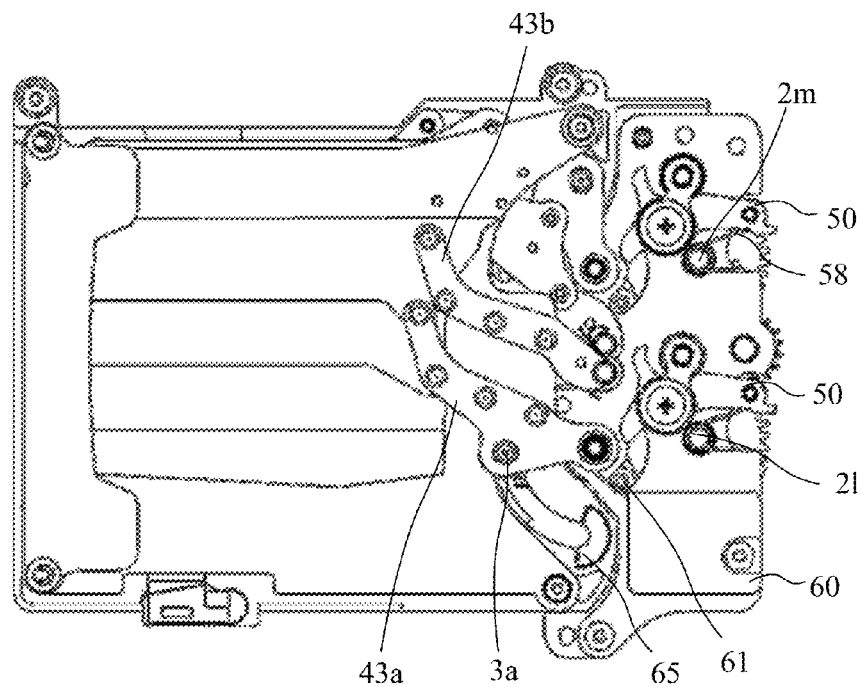

FIG. 3A is an appearance view of the focal-plane shutter from the image-pickup light incident side, and FIG. 3B is an appearance view of the focal-plane shutter from the image-pickup light emission side. In FIG. 3A, an upper base plate 20, a flexible substrate 22, a motor base plate 30, a gear cover 31, and a magnet cover 80 as illustrated in FIG. 2A are omitted. In FIG. 3B, a cover plate 41 as illustrated in FIG. 2B is omitted.

A shutter base plate 1 is formed with synthetic resin material and an opening part 1a which image-pickup light can path through is formed at the center of the shutter base plate 1. The shutter base plate 1 and an auxiliary base plate 2 are fastened by screws at fastening portions 1b, 1c and 1d. Braking buffer member fixed axes 1h and 1i are formed along with the shutter base plate 1 and protrude from holes formed on the auxiliary base plate 2.

The auxiliary base plate 2 is made of a metallic material and reinforces the shutter base plate 1. Axes made of a metallic material are swaged on the auxiliary base plate 2. On the image-pickup light incident side of the auxiliary axis portion 2, a leading blade driving member axis 2a, a trailing blade driving member axis 2b, a leading blade cam gear axis 2c, a trailing blade cam gear axis 2d, an idle gear axis 2e are swaged. Additionally, on the image-pickup light emission side of the auxiliary base plate 2, a leading blade main arm axis 2f, a leading blade sub arm axis 2g, a trailing blade main arm axis 2h and a trailing blade sub arm axis 2i are vertically arranged. Further, on the image-pickup light emission side of the auxiliary base plate 2, a leading blade braking axis 2j, a trailing blade braking axis 2k, a leading blade braking guide axis 2l and a trailing blade braking guide axis 2m are vertically arranged.

A movable end of a leading blade driving spring 5 is hooked on a leading blade driving member 3 and a fixed end of the leading blade driving spring 5 is hooked on an adjuster 70 which adjusts urging force. A movable end of a trailing blade driving spring 6 is hooked on a trailing blade driving member 4 and a fixed end of the trailing blade driving member is hooked on an adjuster 70 which adjusts urging force. By rotating a worm gear 71 so as to be rotated the adjuster 70, urging forces of the leading blade driving spring 5 and the trailing blade driving spring 6 can be adjusted.

Since a leading blade cam gear 8 and a trailing blade cam gear 9 are the same number of teeth and are coupled by the idle gear 12, the leading blade cam gear 8 and the trailing blade cam gear 9 rotate at the same rotational number in the same rotational direction. As illustrated FIG. 3A, the idle gear 12 is arranged outside the leading cam gear 8 and the trailing cam gear 9 as seen from the opening part 1a.

The upper base plate 20 fixes an electric magnet 21 and the flexible substrate 22.

The electric magnet 21 includes a first electric magnet using when travelling a leading blade and a second electric magnet using when travelling a trailing blade. Additionally, a terminal 21a of the electric magnet 21 is connected with a driving circuit (not illustrated) at a connection portion 22a of the flexible substrate 22.

A magnet cover 80 is fixed to the upper base plate 20 so as to cover the electric magnet 21 and protects an attracting portion of the electric magnet 21 and an attracting face of an armature of each blade driving member from outside particle.

A space between the shutter base plate 1 and the upper base plate 20 is used as a travelling space of the leading blade driving member 3 and the trailing blade driving member 4.

A rotational phase (a rotational position) of the trailing blade cam gear 9 is detected when a phase contacting piece 13 formed on the trailing blade cam gear 9 contacts with a phase pattern formed on the flexible substrate 22.

A division plate 40 and a cover plate 41 are attached on the image-pickup light emission side, and blade rooms where a leading blade group 43 and a trailing blade group 44 are arranged respectively formed between the shutter base plate 1 and the division plate 40 and between the division plate 40 and the cover plate 41. An opening part 40a of the division plate 40 and an opening part 41a of the cover plate 41 have forms similar to the opening part 1a of the shutter base plate 1. By overlapping with these three opening parts, an exposure opening part which is rectangle-shaped is formed and a light passing through the shutter is restricted. Reference numeral 42 denotes a spacer.

The leading blade group 43 closes the opening part 1a before an exposure operation. A main arm 43a and a sub arm 43b are rotatably mounted on the leading blade main arm axis 2f and the leading blade sub arm axis 2g, respectively. Reference numeral 43c denotes a first blade forming a slit, reference numeral 43d denotes a second blade, reference numeral 43e denotes a third blade, and reference numeral 43f denotes a fourth blade. Each blade is rotatably supported on the main arm 43a and the sub arm 43b by a pin 43g, and forms parallel link. A leading blade backlash prevention spring 43h is engaged with the sub arm 43b in a direction where the blades overlap.

The trailing blade group 43 closes the opening part 1a when completing an exposure operation. A main arm 44a and a sub arm 44b are rotatably mounted on the trailing blade main arm axis 2h and the trailing blade sub arm axis 2i, respectively. Reference numeral 44c denotes a first blade forming a slit, reference numeral 44d denotes a second blade, reference numeral 44e denotes a third blade, and reference numeral 44f denotes a fourth blade. Each blade is rotatably supported on the main arm 44a and the sub arm 44b by a pin 44g, and forms parallel link. A trailing blade backlash prevention spring 44h is engaged with the sub arm 44b in a direction where the blades expand.

A trailing blade auxiliary spring 62 accessorially urges in a travelling direction in early exposure operation of the trailing blade driving member 4 when the trailing blade driving spring 6 drives the trailing blade driving member 4. The trailing blade auxiliary spring 62 is a torsion spring having a first coil portion and the first coil portion is mounted on a spring guide axis 1e formed on the shutter base plate 1. Thus, the trailing blade auxiliary spring 62 is arranged on a surface (a first surface) where the leading blade driving member 3 and the trailing blade driving member 4 of the shutter base plate 1 are rotatably supported and the first coil portion of the trailing blade auxiliary spring 62 is arranged outside a rotational locus of the trailing blade driving member 4. A movable end of the trailing blade auxiliary spring 62 is hooked on a trailing blade operational pin 4a provided on the trailing blade driving member 4 at the shutter base plate side (a "A" direction in FIGS. 2A and 2B). Additionally, a fixed end of the trailing blade auxiliary spring 62 is hooked on a spring peg portion if provided on the shutter base plate 1 at a side distant from the shutter base plate 1 (a "B" direction in FIGS. 2A and 2B). Therefore, the height of the trailing blade driving member 4 can be lower since the trailing blade driving member 4 can be positioned against more the "A" direction side compared with a state where the first coil portion of the trailing blade auxiliary spring 62 is positioned within the rotational locus of the trailing blade driving member 4. Thus, the present invention provides effects that the trail blade driving member 4 can be thinner by making the height of the trail blade driving member 4 lower (or the number of turns of the trailing blade driving spring can be increased), the length of the trailing blade operational pin 4a can be short, and inertia of the trailing blade driving member 4 can be low.

Reference numeral 60 is an auxiliary spring cover and reference numeral 61 is a leading blade auxiliary spring. The leading blade auxiliary spring accessorially urges in a travelling direction in early exposure operation of the leading blade driving member 3 when the leading blade driving spring 5 drives the leading blade driving member 3. The leading blade auxiliary spring 61 is a torsion spring having a second coil portion. The second coil portion is arranged so as not to overlap with the rotational locus of the sub arm 43b. In other words, the leading blade auxiliary spring 61 is arranged on a surface (a second surface) opposed to the surface where the leading blade driving member 3 and the trailing blade driving member 4 of the shutter base plate 1 are rotatably supported and the second coil portion of the leading blade auxiliary spring 61 is arranged outside the rotational locus of the sub arm 43b. Additionally, a movable end of the leading blade auxiliary spring 61 is hooked on a braking operational pin 3b (a protruding portion) of the leading blade driving member 3. A locus of the braking operational pin 3b does not overlap with the sub arm 43b and does not influence the arrangement of the sub arm 43b. Therefore, the leading blade driving member 3 can be thinner by making the height of the leading blade driving member 3 lower compared with a state where the coil portion of the leading blade auxiliary spring 61 is positioned between the leading blade driving member 3 and the shutter base plate 1.

Reference numeral 65 is a half-moon-shaped shock absorber which is made from a rubber abutting against a leading blade operational pin 3a provided on the leading blade group 43 when completing an exposure operation of the leading blade group 43.

A blade top shock absorber 66 made from a rubber is configured so as to abut against the leading blade group 43 and the trailing blade group 44 when travelling is completed.

A braking shock absorber 67 is formed so as to abut against a braking lever 50 (a braking member) when travelling is completed.

Figure 4A:
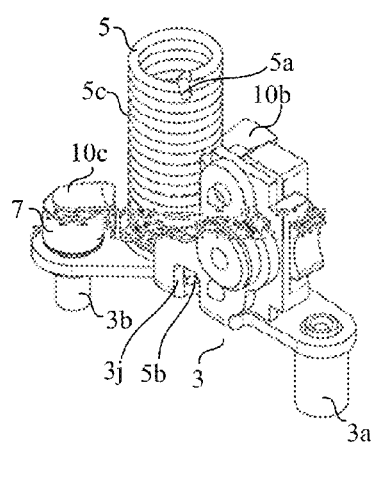
FIGS. 4A-4I are perspective views of a blade driving member of the focal-plane shutter.
Figure 4B:
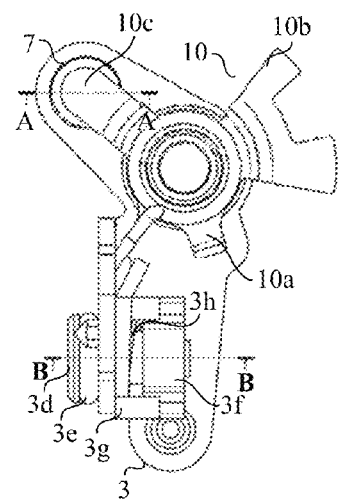
Figure 4C:
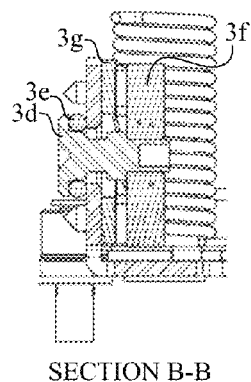
Figure 4D:
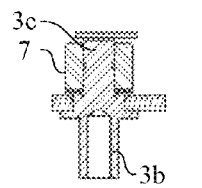
Figure 4E:
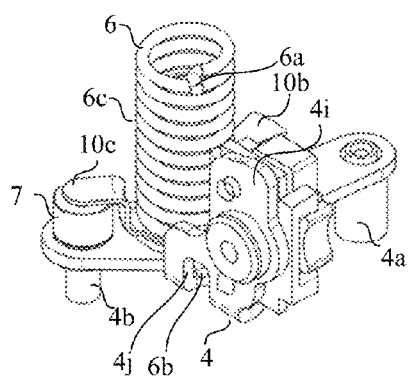
Figure 4F:
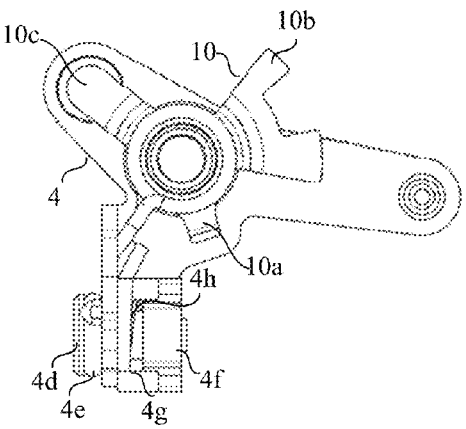
Figure 4G:
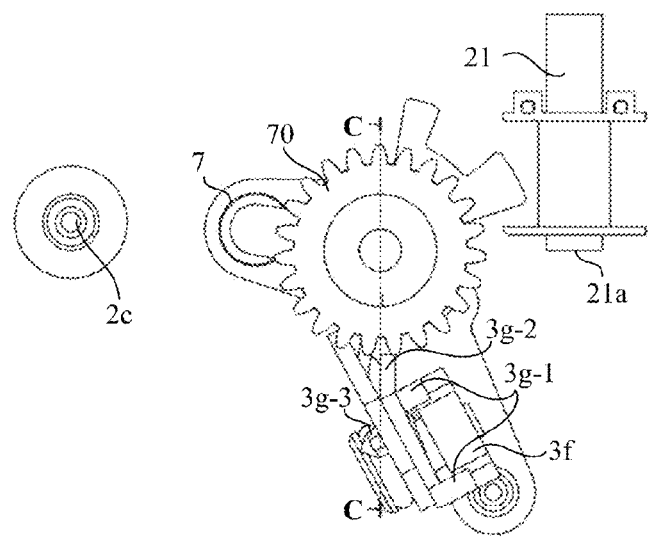
Figure 4H:
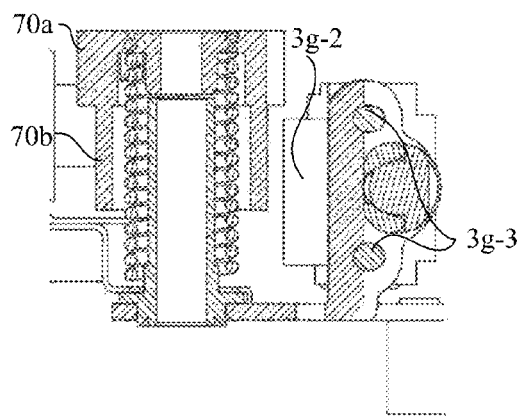
Figure 4I:
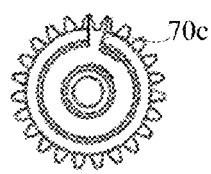

Next, with reference to FIG. 4, the structure of the leading blade driving member 3 and the trailing blade driving member 4 will be described. FIG. 4A is a perspective view of the leading blade driving member 3, and FIG. 4B is a top view of the leading blade driving member 3. Additionally, FIG. 4C is a sectional view of a part which is used for attracting the electric magnet 21, and FIG. 4D is a sectional view of a roller. FIG. 4E is a perspective view of the trailing blade driving member 4, and FIG. 4F is a top view of the trailing blade driving member 4. FIG. 4G is a diagram which illustrates a positional relation of a leading blade driving member 3 as travelling, the adjuster 70, the leading blade cam gear axis 2c, and the electric magnet 21, FIG. 4H is a sectional view of FIG. 4G. FIG. 4I illustrates a back view of the adjuster 70.

The leading blade driving member 3 includes the leading blade operational pin 3a, the braking operational pin 3b, a roller axis 3c, an armature axis 3d, an armature robber 3e, an armature 3f, an armature guide 3g, and an armature spring 3h. The leading blade driving member 3 is rotatably supported by the leading blade driving member axis 2a swaged by the auxiliary base plate 2. When the leading blade driving member 3 is supported by the leading blade driving member axis 2a, the braking operational pin 3b penetrates into the auxiliary base plate 2 and protrudes into the blade room.

The leading blade operational pin 3a engages with a hole formed on the main arm 43a.

The braking operational pin 3b and the roller axis 3c are integrally formed, and are swaged by the leading blade driving member 3. Because the braking operational pin 3 and the roller axis 3c are integral part, parts count decreases. A roller 7 is attached to the roller axis 3c.

The armature axis 3d is swaged by the armature 3f. The armature guide 3g restricts the operation of the armature 3f and assists attraction to the electric magnet 21.

The amateur guide 3g is fixed to the leading blade driving member 3 by heat caulking. The armature guide 3g includes a guide portion 3g-1, a protective barrier (a second barrier) 3g-2, and a heat caulking portion 3g-3.

The adjuster 70 includes a gear 70a and a protective barrier 70b (a first barrier). The gear 70a engages with a worm gear 71. Additionally, since an upper end 5a of the leading blade driving spring 5 is hooked on a spring peg groove 70c of the adjuster 70 and a lower end 5b of the leading blade driving spring 5 is hooked on a spring peg portion 3j of the leading blade driving member 3, urging force to the leading blade driving member 3 is adjustable by rotating the worm gear 71. Reference numeral 5c is a coil portion of the leading blade driving spring 5.

The protective barrier 70b which is a circular shaped is positioned between the leading blade driving spring 5 and the electric magnet 21. Therefore, particles and oil from the roller 7 (a first cam follower), the leading blade cam gear axis 2c and the trailing blade cam gear axis 2d which passes a space and a side of the leading blade driving space 5 can be decreased. As a result, defective attracting and defective accuracy of the electric magnet 21 can be decreased.

Additionally, since a size in a radial direction of the protective barrier 70b is almost equal to or smaller than that of the gear 70a, increasing of each blade driving member can be prevented by arrangement of the protective barrier 70b.

The protective barrier 3g-2 assists the function of the protective barrier 70b. In other words, since the protective barrier 3g-2 is positioned at position having a predetermined clearance from the protective barrier 70b, particles and oil coming from further outside than the protective barrier 70b can be prevented.

Additionally, it is easy to make a gap between the protective barrier 3g-2 and the protective barrier 70b minimum since the protective barrier 3g-2 protrudes toward the rotational center of the leading blade driving member 3 and the protective barrier 70b is a circular shaped whose rotational center is the same that of the leading blade driving member 3. A gap between the protective barrier 3g-2 and the protective barrier 70b is preferably from 0.1 mm to 0.6 mm so as not to disturb the operation of the leading blade driving member 3, and to prevent invading of particles and oil.

The trailing blade driving member 4 includes the trailing blade operational pin 4a, a braking operational pin 4b, a roller axis 4c, an armature axis 4d, an armature robber 4e, an armature 4f, an armature guide 4g, and an armature spring 4h. The trailing blade driving member 4 is rotatably supported by the trailing blade driving member axis 2b swaged by the auxiliary base plate 2. When the trailing blade driving member 4 is supported by the trailing blade driving member axis 2b, the braking operational pin 4b penetrates into the auxiliary base plate 2 and protrudes into the blade room.

The trailing blade operational pin 4a engages with a hole formed on the main arm 44a.

The braking operational pin 4b and the roller axis 4c are integrally formed, and are swaged by the trailing blade driving member 4. The roller 7 is attached to the roller axis 4c.

The armature axis 4d is swaged by the armature 4f. The armature guide 4g restricts the operation of the armature 4f and assists attraction to the electric magnet 21.

The amateur guide 4g is fixed to the trailing blade driving member 4 by heat caulking. The armature guide 4g includes a guide portion, a protective barrier, and a heat caulking portion.

Since an upper end 6a of the trailing blade driving spring 6 is hooked on the spring peg groove 70c of the adjuster 70 and a lower end 6b of the trailing blade driving spring 4 is hooked on a spring peg portion 4j of the trailing blade driving member 4, urging force to the trailing blade driving member 4 is adjustable by rotating the worm gear 71. Reference numeral 6c is a coil portion of the trailing blade driving spring 6.

A PI light shield member 10 is fixed to each blade driving member by the compressed leading blade driving spring 5 and a fitting portion 10a. A PI light shield portion 10b can block detection light of the PI fixed on the upper base plate 20. Thus, the PI light shield portion 10b switches light and dark and of the PI and detects the position of each blade driving member and each blade group. Additionally, a roller dropout prevention portion 10c prevents the roller 7 from dropping out from the roller axis 3c and 4c.

Figure 5A:
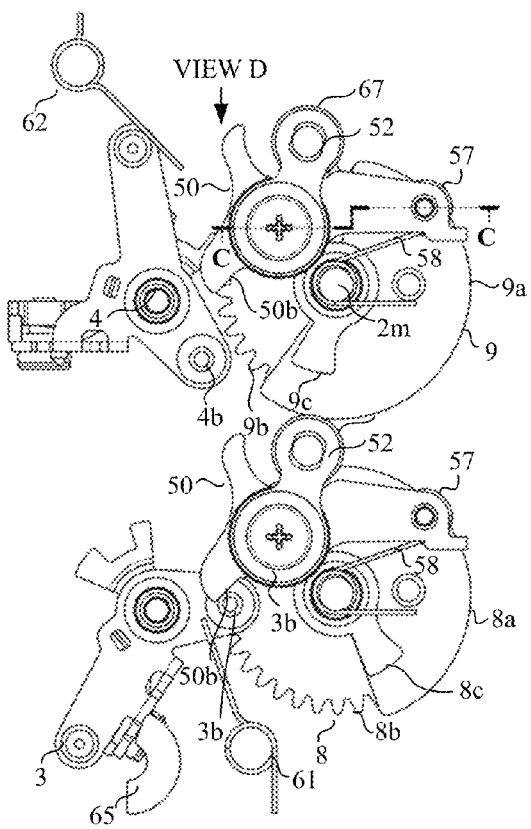
FIGS. 5A-5C are schematic diagrams of illustrating relationships of the blade driving member, a braking lever, and a cam gear of the focal-plane shutter.
Figure 5B:
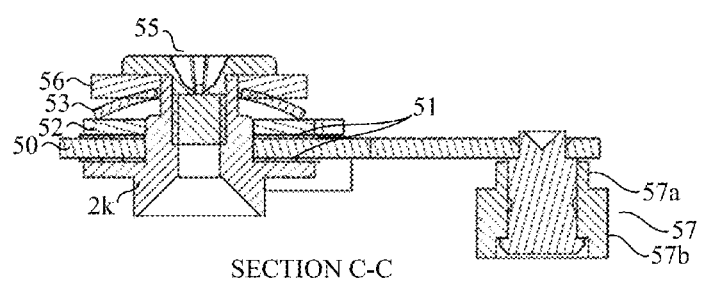
Figure 5C:
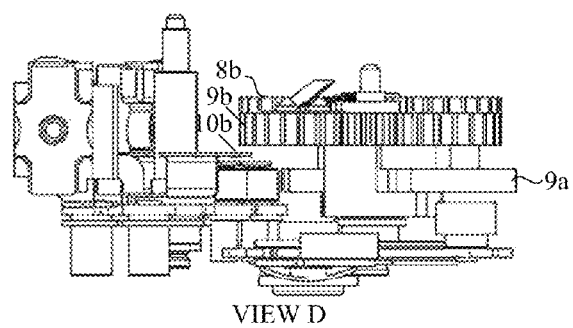

Next, a relationship of a blade driving member, a braking member, and a cam gear are described by using FIGS. 5A-5C.

FIG. 5A is a diagram of illustrating a state where the leading blade group 43 travels and the braking operational pin 3b of the leading blade group 3b abuts against a braking axis abutting portion of the braking lever 50.

In FIG. 5A, the shutter base plate 1 and the auxiliary base plate 2 are omitted so as to see easily. Actually, the leading blade driving member 3, the trailing blade driving member 4, the leading blade cam gear 8 and the trailing blade cam gear 9 are attached to the auxiliary base plate 2 on the image-pickup light incident side (the "B" direction side) in FIG. 2. Meanwhile, each member of the brake is attached to the auxiliary base plate 2 on the image-pickup light emission side opposite to the side where the leading blade driving member 3 etc. attach (the "A" direction side) in FIG. 2.

The braking lever 50 is arranged apart from the opening part 1a compared with the leading blade driving member 3 and the trailing blade driving member 4 as illustrated in FIG. 3

The leading blade cam gear 8 includes a cam 8a for charge of a blade driving member, a gear 8b, and a cam 8c for charge of brake.

The trailing blade cam gear 9 includes a cam 9a for charging of a blade driving member, a gear 9b, and a cam 9c for charging of a brake.

A braking recovery spring (a braking member recovery spring) 58 is provided so as to decrease a braking charge load by backing the braking lever 50 against friction force in a direction opposite to a braking direction. A conventional braking recovery spring is positioned so that a coil portion overlaps with a movable range of a braking lever. However, in this case, the height of the braking mechanism becomes high and the thickness of the entire shutter unit increases. Therefore, in this embodiment, the height of the braking lever 50 can be lowered since the coil portion of the braking pull-down spring is inserted into the trailing blade braking guide axis 2m which is positioned outside the movable range of the braking lever 50. Then, the coil portion of the braking recovery spring 58 does not become coaxial with the rotational center of the braking lever 50. The movable end of the spring is hooked on a rotatable roller (a second cam follower) 57 so as to suppress the friction which is generated due to continuous changes of the contact position of the braking lever 50 and the braking recovery spring 58 by the rotation of the braking lever 50. The fixed end of the braking recovery spring 58 is hooked on bending portions 41b, 41c of a cover plate 41.

FIG. 5B is a sectional view illustrating the configuration of the brake for the trailing blade. The same can be applied to the configuration of the brake for the leading blade.

The braking lever 50 is interleaved between friction members 51 and rotatably engages with the trailing blade braking axis 2k. Additionally, the braking lever 50 receives the pressure of a leaf spring through a fixed plate 52 non-rotatably engaging around the trailing blade braking axis 2k.

The roller 57 engages with the braking lever 50. A movable end of the braking member recovery spring 58 is hooked on a spring peg portion 57a. The cam follower 57b rotates the braking lever 50 toward a predetermined standby state by sliding with the cam 8c of the leading blade cam gear 8 in charging sequence.

Though this braking charge operation is conventionally operated through the blade driving member, the loss of the energy transfer can be reduced by directly operating the braking charge operation with the cam gear.

When operating the braking operation, the braking operational pin 3b of the leading blade driving member 3 protrudes into the surface of the image-pickup light emission side of the auxiliary spring 2 from the surface of the image-pickup light incident side of the auxiliary spring 2 and abuts against the braking axis abutting portion 50b of the braking lever 50. Then, shavings may be generated with the increasing the number of operation since the braking operational pin 3b rubs on the braking axis abutting portion 50b. In view of this point, in this embodiment, a harmful influence toward the electric magnet can be minimally suppressed even if shavings generate since the braking mechanism is positioned in the blade room fully apparent from the electric magnet.

The braking lever 50 collides with the braking buffer member 67 fixed on the braking buffer member fixed axes 1h and 1i formed on the shutter base blade 1 and stops after rotation of a predetermined amount. Additionally, since the energy generated in the driving spring wastes if the operational range of the brake is broader, the above range is set as a predetermined range before completing travelling.

A fastener member 55 comprises a nut for fastening or a screw etc., and an adjustment plate 56 sets the charging amount of the leaf spring 53 by fastening the fastener member 55 and adjusts the pressure of the leaf spring 53.

FIG. 5C is a diagram illustrating the upper side of FIG. 5A.

The PI light shield portion 10b of the PI light shield member 10 fixed on the leading blade driving member 3 is positioned between the cam 8a and the gear 8b of the leading blade cam gear 8. The PI light shield member 10 fixed on the leading blade driving member 3 can keep the clearance with the cam 8a and the gear 8b of the leading blade cam gear 8, and can be positioned so as to operate along with the leading blade driving member 3 since.

The PI light shield portion 10b of the PI light shield member 10 fixed on the trailing blade driving member 4 is positioned between the cam 9a and the gear 9b of the trailing blade cam gear 9. The PI light shield member 10 fixed on the trailing blade driving member 4 can keep the clearance with the cam 9a and the gear 9b of the trailing blade cam gear 9, and can be positioned so as to operate along with the trailing blade driving member 4.

Figure 6A:
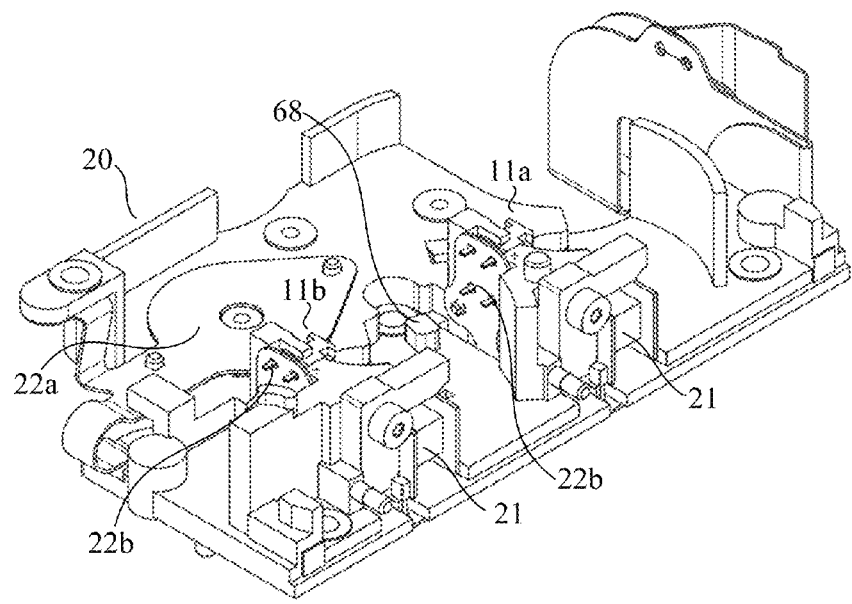
FIGS. 6A-6C are perspective views of an upper base plate of the focal-plane shutter.
Figure 6B:
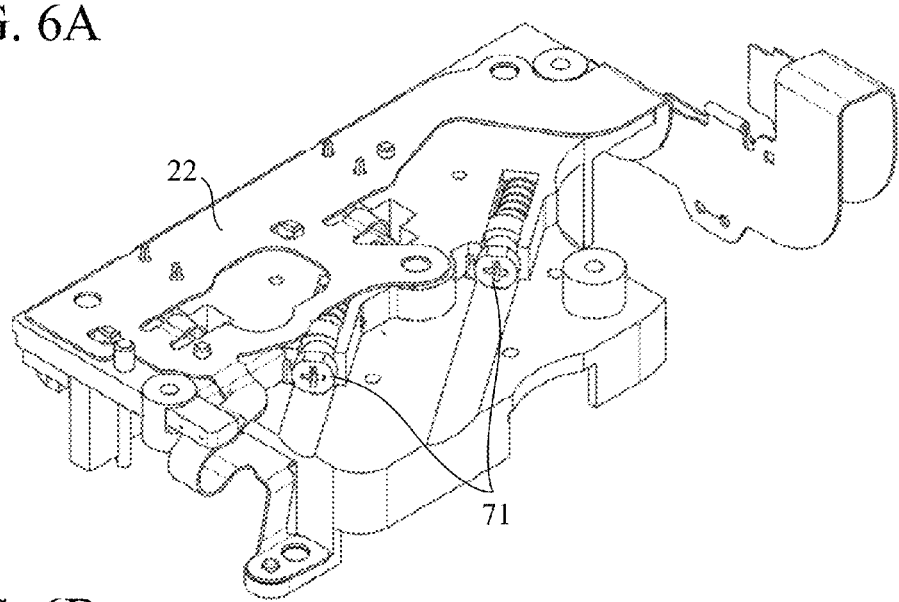
Figure 6C:
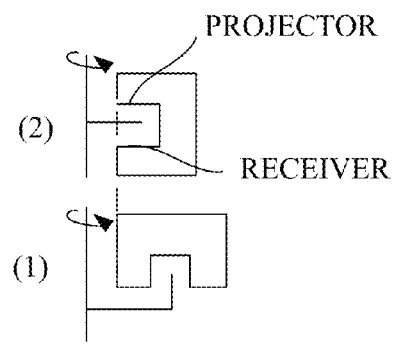

FIGS. 6A-6C are perspective views of the upper base plate 20. FIG. 6A is a perspective view of the surface of the image-pickup light emission side and FIG. 6B is a perspective view of the surface of the image-pickup light incident side.

A leading blade PI (a first optical detector) 11a and a trailing blade PI (a second optical detector) 11b detect the rotational positions of the leading blade driving member 3 and the trailing blade driving member 4, respectively. Reference numeral 68 denotes a trailing blade driving member shock absorber.

The leading blade PI 11a and the trailing blade PI 11b are connected with a PI connector 22b of the flexible substrate 22 passed through a hole or a groove of the upper base plate 20. The hole or the groove of the upper base plate 20 is formed so as to overlap with a plane connecting the leading blade driving member axis 2a and the trailing blade driving member axis 2b Additionally, the arrangement "(2)" illustrated in FIG. 6C is miniaturized and arranged compared with the arrangement "(1)" illustrated in FIG. 6C since the rotational diameter of the PI light shield portion becomes small when the PI is close to the rotational position of the PI light shied member.

In this embodiment, the leading blade PI 11a is positioned between the leading blade driving member axis 2a and the trailing blade driving member axis 2b so that a line connecting between the projector and the receiver of the leading blade PI 11a is almost parallel to the rotational axis of the leading blade driving member 3. Additionally, as illustrated in FIG. 3A, the distance between the opening part 1a and each electric magnet 21 for the leading blade and the trailing blade is shorter than a line connecting between the opening part 1a and the rotational center of the leading blade cam gear 8 or the trailing blade cam gear 9. And, the leading blade PI 11a and the trailing blade PI 11b are positioned between a line connecting the electric magnets 21 of the leading blade and the trailing blade and a line connecting the rotational centers of the leading blade cam gear 8 and the trailing blade cam gear 9. Therefore, the miniaturization of the shield member 10b can be achieved and the inertia of the leading blade driving member 3 can become small since the PI can be close to the rotational center of the detector. Additionally, PI can be positioned without increasing in size of the shutter unit. Since the trailing blade PI 11b overlaps with the rotational range of the trailing blade driving member 4 in a plane, the PI can be positioned without increasing in size of the shutter unit.

Additionally, relative positional relation of the leading blade PI 11a with respect to the leading blade driving member 3 and relative positional relation of the trailing blade PI 11b with respect to the trailing blade driving member 4 are the same. Therefore, the PI light shield member 10 uses for both the leading blade driving member 3 and the trailing blade driving member 4 if the PI light shield member 10 is formed as the same shape.

Figure 7:
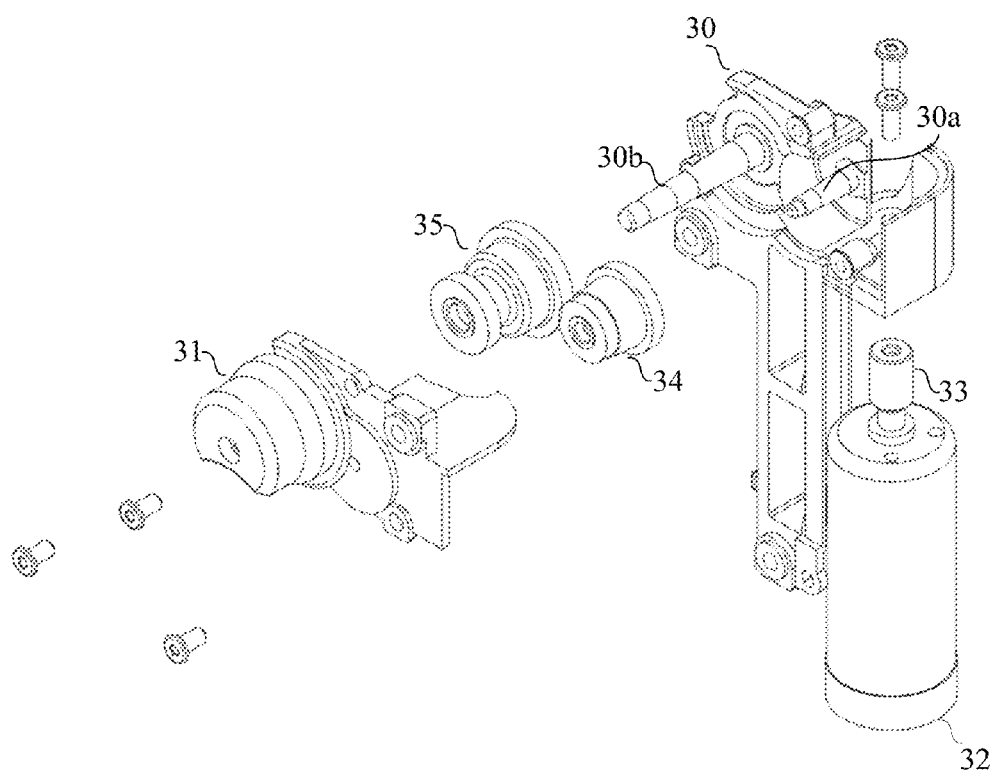
FIG. 7 is an exploded perspective view of a motor unit of the focal-plane shutter.

FIG. 7 is an exploded perspective view of a motor unit.

The motor base plate 30 is fastened on the upper base plate 20 by the screw, and the gear cover 31 and a motor 32 are fastened on the motor base plate 30 by the screw.

The rotation from the motor 32 is transmitted to a pinion gear 33, a first reduction gear 34, a second reduction gear 35, the leading blade cam gear 8, the idle gear 12, and the trailing blade cam gear 9 in this order.

In a live view mode, a position gap with the idle gear 12 and the cam gear is decreased by positioning the phase contacting piece 13 on the trailing blade cam gear 9 since the trailing blade is hold on the trailing blade cam gear 9. Therefore, the live view phase can narrow compared with positioning the phase contacting piece 13 on the leading blade cam gear 8. Thus, since the rotational angle of the cam becomes small when passing the live view phase in normal release, energization time of the motor 32 and release time lag can be short.

The first reduction gear 34 is pivotally supported by an axis 30a of the motor base plate 30 and the second reduction gear 35 is pivotally supported by an axis 30b of the motor base plate 30. The top of the axis 30b fits the auxiliary base plate 2 and a distance between the axis 30b and the leading blade cam gear axis 2c swaged by the auxiliary base plate 2 is kept within a predetermined range.

An operation of each component is described by using FIGS. 8 to 20.

Figure 8A:
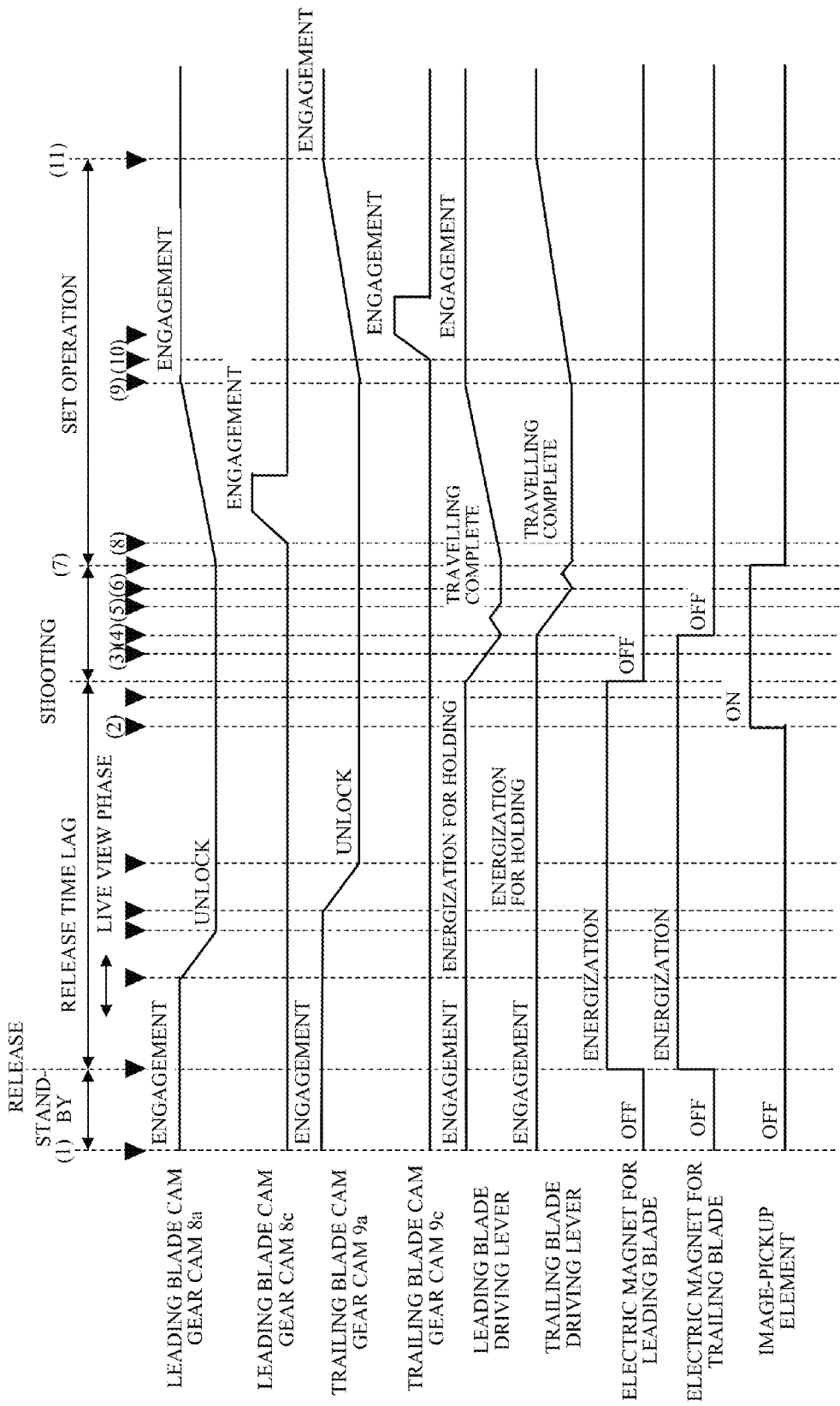
FIG. 8A and FIG. 8B are schematic diagrams of illustrating operation sequence of each component of the focal-plane shutter.
Figure 8B:
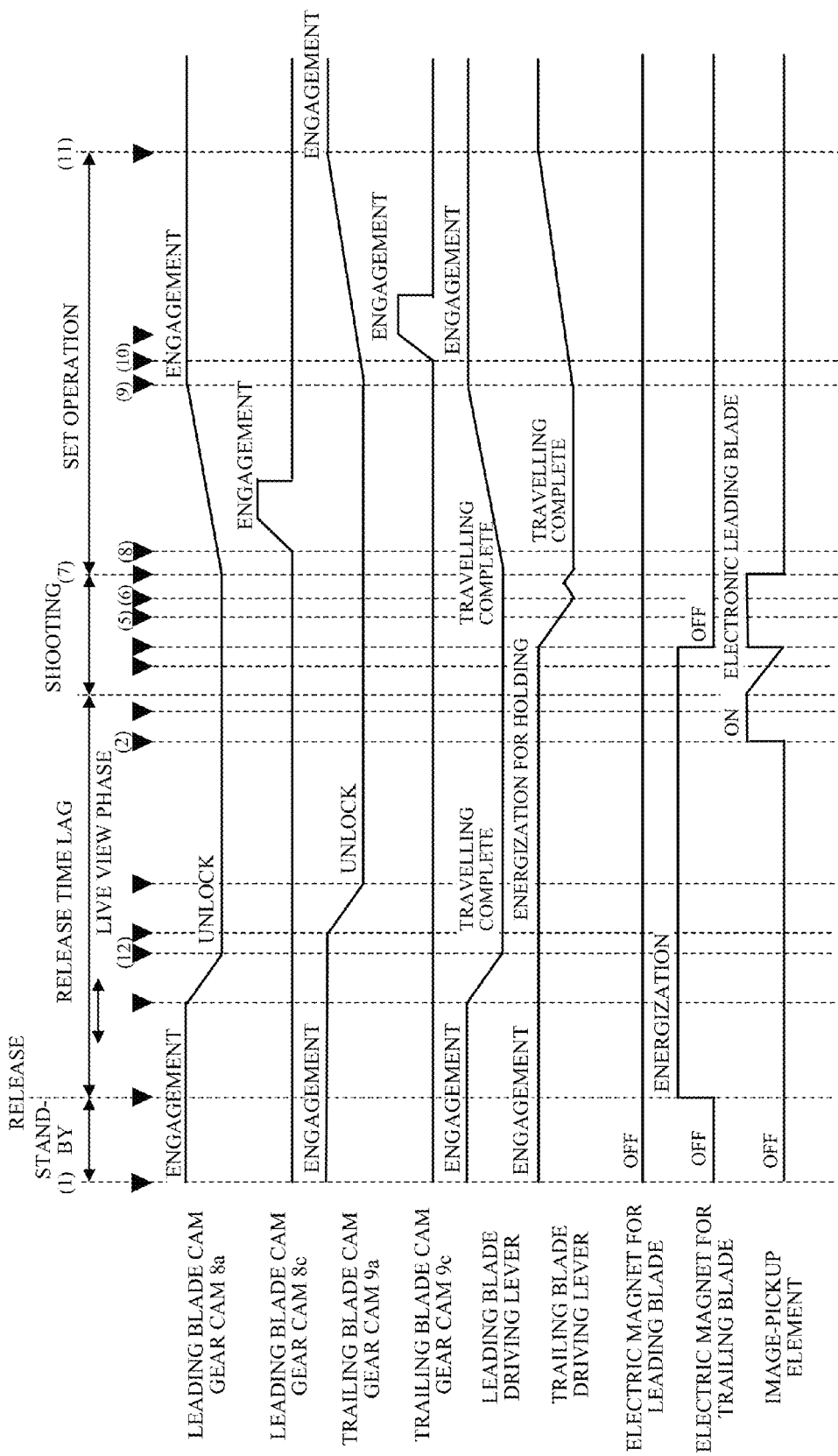

FIG. 8A is a schematic diagram of illustrating an operation sequence of each component of the focal-plane shutter at normal shooting, and FIG. 8B is a schematic diagram of illustrating an operation sequence of each component of the live view shooting. FIGS. 9-19 are schematic diagrams of illustrating state transition of the focal-plane shutter, and FIGS. 20A-20C are schematic diagrams of illustrating member regarding charge of the blade driving member of the focal-plane shutter.

First, the operation of each component at normal shooting is described.

(1) Standby State Before Release

In (1) of FIGS. 8A and 8B, the focal-plane shutter is positioned at the standby position before release. The state of each component is illustrated in FIGS. 9A and 9B. In this state, the roller 7 of the leading blade driving member 3 contacts with a cam top of the cam 8a of the leading blade cam gear 8. The roller 7 of the trailing blade driving member 4 contacts with a cam top of the cam 9a of the trailing blade cam gear 9. Therefore, the leading blade cam gear 8 locks with the leading blade driving member 3 so as to make the leading blade driving member 3 right-handed as illustrated in FIG. 9A. The trailing blade cam gear 9 locks with the trailing blade driving member so as to make the trailing blade driving member 4 right-handed as illustrated in FIG. 9A.

The leading blade driving member 3 and the trailing blade driving member 4 are more rotated than a position capable of holding by attracting the armatures 3f, 4f to the electric magnet 21 so as to keep the attracting state between the armatures 3f, 4f and the electric magnet 21. This state is called an overcharge state. In the case of the leading blade driving member 3, an overcharge amount is absorbed by a gap between the armature robber 3e and the leading blade driving member 3.

Additionally, the armatures 3f, 4f are urged by the armature springs 3h, 4h since the position of the armature from start to release of overcharge is stabilized.

(2) Overcharge Release

If a release signal is received on (1) the standby state before release in FIGS. 8A and 8B, energization to the motor 32 is started, and the leading blade cam gear 8 and the trailing blade came gear 9 are started to rotate. Further, the electric magnets 21 of the leading blade and the trailing blade are started to energize.

Then, both the leading blade cam gear 8 and the trailing blade cam gear 9 are turned right-handed from the state of FIG. 9A. The cam 9a of the trailing blade cam gear 9 does not contact with the roller 7 of the trailing blade driving member 4 and the leading blade cam gear 8 and the trailing blade cam gear 9 stop after the state where the cam 8a of the leading blade cam gear 8 does not contact with the roller 7 of the leading blade 3. Then, the leading blade driving member 3 and the trailing blade driving member 4 rotate since the locking thereof are released, but the leading blade driving member 3 and the trailing blade driving member 4 stop after rotating of a predetermined amount since the electric magnets 21 are energized and the armatures 3f, 4f are attracted to the electric magnets of the leading blade and the trailing blade. In other words, the gap between the armature robber 3e and the leading blade driving member 3 generated by overcharge is disappeared, the armature robber 3e is compressed and the leading blade driving member 3 is right-handed rotated so as to go with the leading blade driving spring 5 and is held. Similarly, the gap between the armature robber 4e and the trailing blade driving member 4 is disappeared, the armature robber 4e is compressed and the trailing blade driving member 4 is right-handed rotated so as to go with the trailing blade driving spring 6 and is held.

Further, when the motor 32 rotates, the focal plane shutter transits to (2) in FIGS. 8A and 8B. Then, the state of each component becomes the state operated overcharge release illustrated in FIG. 10.

(3) Unlock of Energization for Holding

When the motor 32 is stopped and a predetermined time is passed, the electric magnets 21 of the leading blade and the trailing blade operate energizing release at an arbitrary interval. The difference of energizing release time is comparable with an exposure time. Though there are both cases that an exposure time is longer or shorter than a travelling time of the leading blade group 43, here the case that an exposure time is longer than a travelling time of the leading blade group 43 is described.

First, the energization of the electric magnet 21 for the leading blade is released. Therefore, the leading blade driving member 3 starts right-handed turning from the state of FIG. 10A since the leading blade driving member 3 is urged by the leading blade driving spring 5 and the leading blade auxiliary spring 61. After the leading blade driving member 3 rotates a predetermined amount, the leading blade auxiliary spring 61 abuts against a stopper (not shown) and finishes urging to the leading blade driving member 3.

Afterward, the leading blade driving spring 5 urges the leading blade driving member 3. Subsequently, the braking operational pin 3b of the leading blade driving member 3 abuts against the braking lever 50 ((3) in FIG. 8A). FIGS. 11A and 11B illustrate the above state.

After (3) in FIG. 8A, the leading blade driving member 3 pushes the braking lever 50 put a friction brake between the friction members 51 so as to travel to the travelling completed position.

Figures 12A, 12B, 13A, 13B, 14A, 14B:
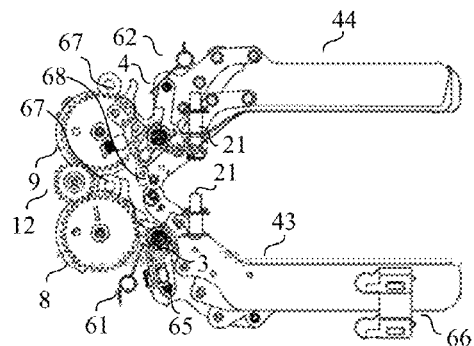
FIG. 12A and FIG. 12B are schematic diagrams of illustrating state transition of the focal-plane shutter.
FIG. 13A and FIG. 13B are schematic diagrams of illustrating state transition of the focal-plane shutter.
FIG. 14A and FIG. 14B are schematic diagrams of illustrating state transition of the focal-plane shutter.

The leading blade driving member 3 are put a friction from the braking lever 50 and travels, and travelling is completed until the leading blade operational pin 3a abuts against the half-moon-shaped shock absorber 65 ((4) in FIG. 8A). FIGS. 12A and 12B illustrate the above state.

The leading blade group 43 does not suddenly stop and deforms so as to overrun, and the first blade 43c collides with the blade top shock absorber 66 which is predetermined distances away from the first blade 43c. Additionally, the braking lever 50 also overruns and collides with the braking shock absorber 67.

Afterward, the trailing blade driving member starts right-handed turning from the state of FIG. 12A since the trailing blade driving member 4 is urged by the trailing blade driving spring 6 and the trailing blade auxiliary spring 62. The travelling of the trailing blade driving member 4 is almost the same as the travelling of the leading blade driving member 3.

First, when the trailing blade driving member rotates a predetermined amount, the trailing blade auxiliary spring 62 abuts against a stopper (not shown) and finishes urging to the trailing blade driving member 4.

Afterward, the trailing blade driving spring urges the trailing blade driving member 4. Subsequently, the braking operational pin 4b (a protruding portion) of the trailing blade driving member 4 abuts against the braking lever 50 ((5) in FIGS. 8A and 8B). FIGS. 13A and 13B illustrate the above state.

After the state of FIG. 13, the trailing blade driving member 4 pushes the braking lever 50 put a friction brake between the friction members 51 so as to travel to the travelling completed position.

The trailing blade driving member 3 travels while receiving a friction from the braking lever 50, and the travelling is completed when the braking lever 50 collides with the braking shock absorber 67 ((6) in FIGS. 8A and 8B). FIGS. 14A and 14B illustrate the above state.

The trailing blade group 44 does not suddenly stop and deforms so as to overrun, and the first blade 44c collides with the blade top shock absorber 66 which is predetermined distances away from the first blade 44c. Additionally, the trailing blade driving member 4 overruns since a bending portion attaching the armature 4f slightly deforms by a weight of the armature 4f. Therefore, a robber collision portion 4i of the trailing blade driving member 4 collides with the shock absorber 68 which is provided on the upper base plate 20 and is predetermined distance away from the trailing blade driving member 4.

Additionally, the shock absorber 68 collides with a screw retainer of the shutter base plate 1 after deforming. Since the trailing blade driving member 4 is made by pressing a metal plate, the end surface of the trailing blade driving member 4 is normally rough such as a shear surface and a fracture surface. The robber collision portion 4i uses a planar portion of curve of the trailing blade driving member 4, and generation of particles may be suppressed compared to a case that the end surface of the trailing blade driving member 4 collides with the shock absorber 68.

(4) Charge of Leading Blade Driving Member

Figure 15A:
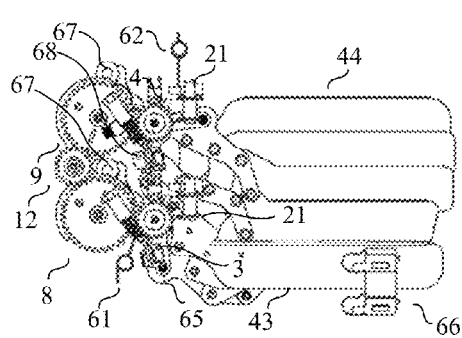
FIG. 15A and FIG. 15B are schematic diagrams of illustrating state transition of the focal-plane shutter.
Figure 15B:
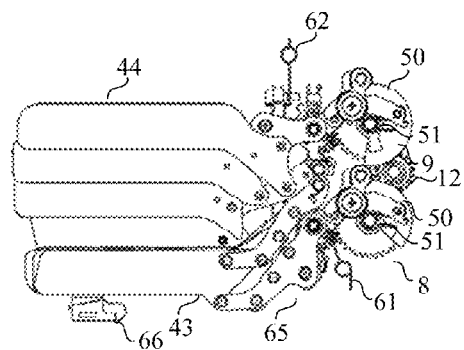

After passing a predetermined time from the travelling of the trailing blade driving member 4, the motor 32 is energized. The leading blade cam gear 8 and the trailing blade cam gear 9 start right-handed turning in the state of FIG. 14A, and reach to a position where the leading blade driving member 3 is charged ((7) in FIGS. 8A and 8B). FIGS. 15A and 15B illustrate the above state.

The cam 8c for charge of brake of the leading blade cam gear 8 does not reach a position where the cam 8c charges the braking lever 50. The braking lever 50 abuts against the braking operational pin 3b on the travelling completed state of the leading blade group 43. Therefore, if the leading blade driving member 3 is not previously charged, the leading blade driving member needs to charge indirectly by charge of brake. In this embodiment, it is difficult to make the cam 8c for charge of brake a shape suitable for charge load due to restriction of shape. Thus, the cam 8c is set so that a charge of the leading blade driving member 3 and a charge of the braking lever 50 are operated in order by rotation of the leading blade cam gear 8.

FIG. 20A is a schematic diagram of only illustrating the leading blade driving member 3, the trailing blade driving member 4, the leading blade cam gear 8, the trailing blade cam gear 9 and the idle gear 12 regarding charge operation in (7) of FIGS. 8A and 8B as seen from the cam surface side. The roller 7 of the leading blade driving member 3 abuts against a cam surface 8a1 of the cam 8a of the leading blade cam gear charging. When the roller 7 slides on the cam surface 8a1, charge of the leading blade cam gear 8 is started. Then, the position of the leading blade cam gear 8 is X1.

(5) Charge of the Leading Blade Brake

Figure 16A:
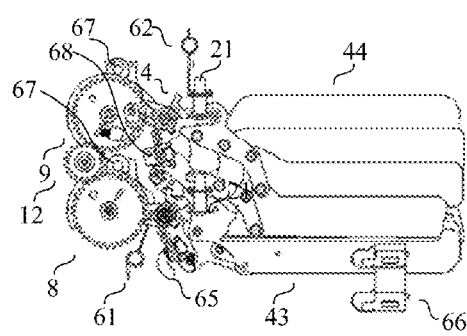
FIG. 16A and FIG. 16B are schematic diagrams of illustrating state transition of the focal-plane shutter.
Figure 16B:
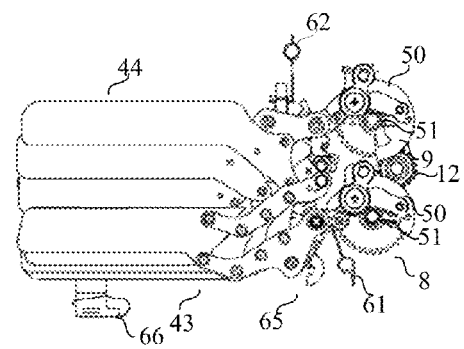

The states of FIGS. 16A and 16B are states where the leading blade cam gear 8 further rotates right-handed from the state of FIG. 15A ((8) in FIGS. 8A and 8B), and charge of the braking lever 50 is started. Then, the leading blade driving member 3 is in the middle of charge and there is a gap between the braking lever 50 and the braking operational pin 3*b*. Therefore, the cam 8*c* for charge of brake can charge only the braking lever 50. Then, the braking member recovery spring 58 backs the braking lever 50 against frictional force in a direction opposite to the braking direction so as to decrease braking charge load. Additionally, engagement of the roller 57 by the cam 8*c* is immediately released after charge of brake, but braking frictional force is adjusted so that the braking lever 50 is not further urged by the braking recovery spring 58.

(6) Charge of Trailing Blade Driving Member

Figure 17A:
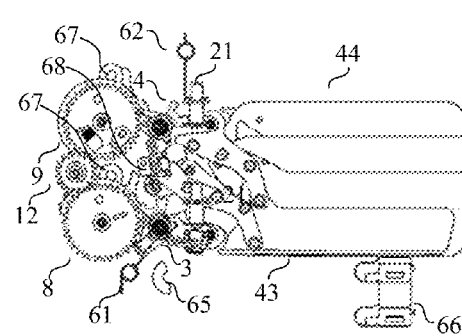
FIG. 17A and FIG. 17B are schematic diagrams of illustrating state transition of the focal-plane shutter.
Figure 17B:
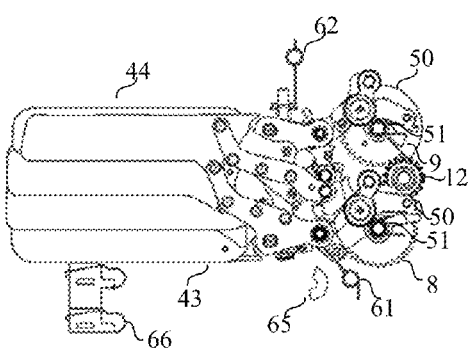

The states of FIGS. 17A and 17B are states where the trailing blade cam gear 9 further rotate right-handed from the state of FIG. 16A ((9) in FIGS. 8A and 8B), and the trailing blade driving member 4 reaches to charge position.

The relationship between the trailing blade driving member 4 and the braking lever 50 is similar to the relationship between the leading blade driving member 3 and the braking lever, and the trailing blade driving member 4 is charged previous to charge of the braking lever 50.

FIG. 20B is a schematic diagram of only illustrating the leading blade driving member 3, the trailing blade driving member 4, the leading blade cam gear 8, the trailing blade cam gear 9 and the idle gear 12 regarding charge operation in (9) of FIGS. 8A and 8B as seen from the cam surface side. In FIG. 20B, the roller 7 of the leading blade driving member 3 reaches to a cam top of the cam surface 8*a*1 of the leading blade cam gear 8. Then, the position of the leading blade cam gear 8 is X2. A charge rotational angle X2−X1 of the leading blade cam gear 8 until the leading blade driving member 3 is charged is θ1. Meanwhile, the roller 7 of the trailing blade driving member 4 engages with a cam surface 9*a*1 of the cam 9*a* of the trailing blade cam gear 9 charging, and charge of the trailing blade driving member 4 is started. Then, the position of the trailing blade cam gear 9 is X3.

The leading blade driving member 3 and the trailing blade driving member 4 are charged in order so as to keep the opening part shielding in charge of the leading blade driving member 3 and the trailing blade driving member 4.

(7) Charge of Trailing Blade Brake

Figure 18A:
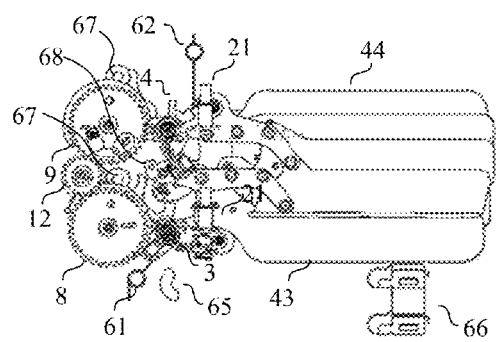
FIG. 18A and FIG. 18B are schematic diagrams of illustrating state transition of the focal-plane shutter.
Figure 18B:
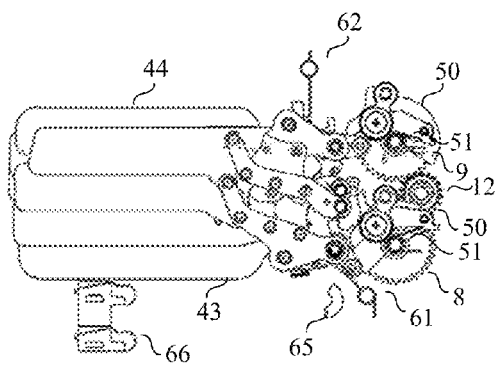

The states of FIGS. 18A and 18B are states where the trailing blade cam gear 9 further rotates right-handed from the state of FIG. 17A ((10) in FIGS. 8A and 8B), and charge of the braking lever 50 is started. Then, the trailing blade driving member 4 is in the middle of charge and there is a gap between the braking lever 50 and the braking operational pin 4*b*. Therefore, the cam 9*c* for charge of brake can charge only the braking lever 50.

Figure 19A:
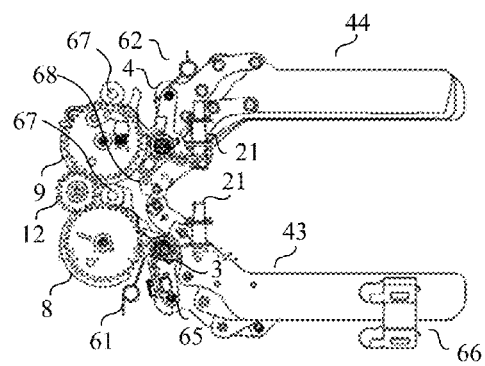
FIG. 19A and FIG. 19B are schematic diagrams of illustrating state transition of the focal-plane shutter.
Figure 19B:
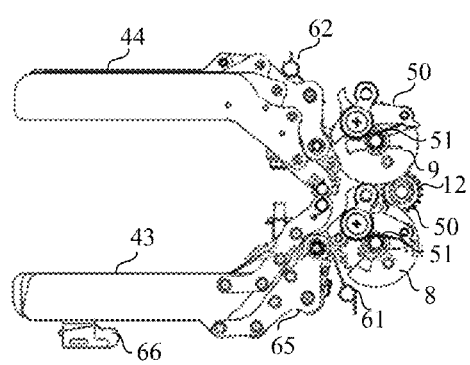
Figure 20C:
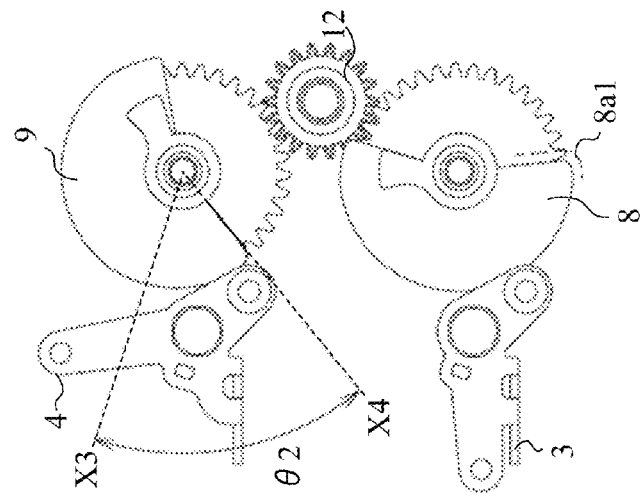
FIGS. 20A-20C are schematic diagrams of illustrating member regarding charge of the blade driving member of the focal-plane shutter.
Figure 20B:
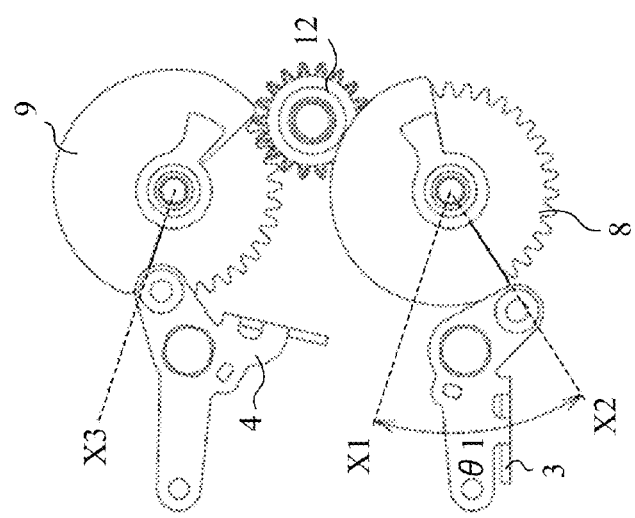
Figure 20A:
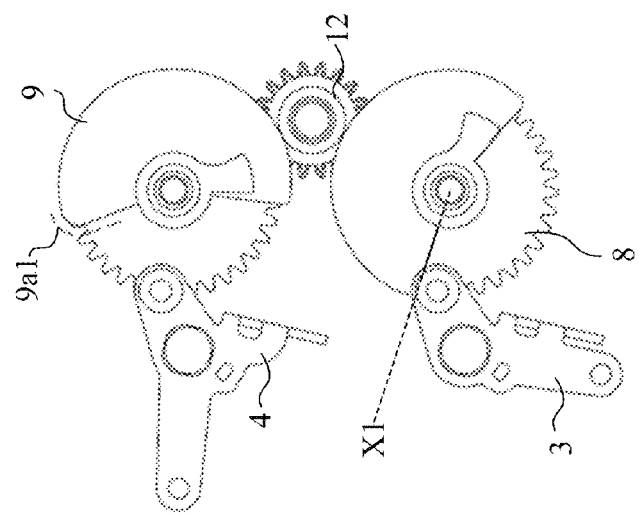

The state where charge of the trailing blade brake is completed is the state of FIGS. 19A and 19B ((11) in FIG. 8)

FIG. 20C is a schematic diagram of only illustrating the leading blade driving member 3, the trailing blade driving member 4, the leading blade cam gear 8, the trailing blade cam gear 9 and the idle gear 12 regarding charge operation in (9) of FIGS. 8A and 8B as seen from the cam surface side. In FIG. 20C, the roller 7 of the trailing blade driving member 4 reaches to a cam top of the cam surface 9*a*1 of the trailing blade cam gear 9. Then, the position of the trailing blade cam gear 9 is X4. A charge rotational angle X4−X3 of the trailing blade cam gear 9 until the trailing blade driving member 4 is charged is θ2. As previously indicated, R-shape of the cam surface 9*a*1 of the trailing blade cam gear 9 is larger than that of the cam surface 8*a*1 of the leading blade cam gear 8 and charge rotational angle becomes θ1<θ2.

Here, since rotation from the motor 32 is transmitted to the trailing blade cam gear 9 through the leading blade cam gear 8 and the idle gear 12, transmission efficiency to the trailing blade cam gear from the motor 32 is inefficient compared with transmission efficiency to the leading blade cam gear 8 from the motor 32. Therefore, if each charge rotational angle of the leading blade cam gear 8 and the trailing blade cam gear 9 are the same, consumption current during charge of the tailing blade driving member 4 is larger than that of the leading blade driving member 3. In this embodiment, since charge rotational angle is θ1<θ2, each consumption current of the leading blade driving member 3 and the trailing blade driving member 4 during charge is almost the same. Therefore, load to a battery of the image-pickup apparatus 101 can decrease by decreasing maximum value of consumption current, for example, shooting state can be kept even if consumption current of the motor 32 increases under a cool environment.

The charge rotational angle θ2 of the trailing blade cam gear 9 is desirable to express as the following formula. T1 is charge torque of the leading blade driving member, T2 is charge of the trailing blade driving member and η is transmission efficiency of each gear. In this embodiment, transmission efficiency is η2 since two teeth of the trailing blade cam gear 9 is bitten through the idle gear 12.

Further, when energizing to the motor 32 is continued, the state of FIG. 9A is returned and a series of sequence is completed.

Next, the operation of each component at live view shooting is described. Common symbol and illustration are left out the explanation.

(1) Standby State Before Release

This state is the same as the standby state before release at normal shooting and is the state of FIG. 9A.

(2) Live View Phase Release

When the release signal is received, energization to the motor 32 is started, and the leading blade cam gear 8 and the trailing blade cam gear 9 start to travel right-handed from the state of FIG. 9A. The difference from normal release is that the electric magnet 21 for the trailing blade is energized and the electric magnet 21 for the leading blade is not energized. A range from overcharge release of the leading blade cam gear 8 to beginning of overcharge release of the trailing blade cam gear 9 is called a live view phase.

In the state of FIG. 9A, when right-handed rotation of the leading blade cam gear 8 is started, abutment between the cam 8*a* of the leading blade cam gear 8 and the roller 7 of the leading blade driving member 3 is released. Then, since the electric magnet 21 for the leading blade is not energized, the leading blade driving member 3 travels toward the travelling completed position ((12) in FIGS. 8A and 8B). Meanwhile, abutment between the cam 9*a* of the trailing blade cam gear 9 and the roller 7 of the trailing blade driving member 4 is released. Then, the electric magnet 21 for the trailing blade is not energized and the roller 7 of the trailing blade driving member 4 is engaged with the cam 9*a* of the trailing blade cam gear 9.

(3) Unlock of Energization for Holding

When the predetermined time is passed after stopping the motor, an image-pickup element (not shown) starts electric leading blade travelling. Explanation of an electronic leading blade travelling is left out. The electronic leading blade travelling is followed by release of energization of the electric magnet 21 for the trailing blade. An exposure time of the image-pickup element is decided by the timing of the electronic leading blade simulated the leading blade and the energization release of the electric magnet 21 for the trailing blade. The trailing blade driving member 4 travels toward the travelling completed position by the energization release of the electric magnet 21 for the trailing blade.

Explanation of the following release sequences is left out since it is basically the same as normal shooting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-202603, filed on Sep. 14, 2012, which is hereby incorporated by reference herein in its entirety.

What is claimed is:

1. A focal-plane shutter comprising:
at least one blade group;
a shutter base member including a first surface on which the blade group is arranged and a second surface, which is a back side of the first surface;
a blade driving member configured to drive the blade group between a standby position and a travelling completed position; and
a braking member arranged on the first surface,
wherein the blade driving member is rotatably arranged on the second surface of the shutter base member and includes a protruding portion arranged on the first surface through the shutter base member, and
wherein in a case where the blade group is driven from the standby position to the travelling completed position, the braking member abuts the protruding portion arranged on the first surface.

2. The focal-plane shutter according to claim 1, further comprising:
a charge member configured to drive the blade driving member so that the blade group is driven from the travelling completed position to the standby position,
wherein the braking member is movable between a first position and a second position,
wherein in a case where the braking member abuts the protruding portion, the braking member moves from the first position to the second position, and
wherein the charge member drives the braking member from the second position to the first position.

3. The focal-plane shutter according to claim 1, further comprising:
a charge member configured to drive the blade driving member so that the blade group is driven from the travelling completed position to the standby position,
wherein a cam portion is formed on the charge member so as to contact the blade driving member, and
wherein the protruding portion and an axis which holds a first cam follower following the cam portion are on the same axis.

4. The focal-plane shutter according to claim 3, further comprising:
a braking member recovery spring configured to urge the braking member toward the first position,
wherein a coil portion of the braking member recovery is arranged outside a rotational locus of the braking member, and
wherein a movable end of the braking member recovery spring is hooked on a second cam follower following the cam portion, and urges the braking member.

5. The focal-plane shutter according to claim 1, further comprising:
a cover member which is attached to the first surface of the shutter base member,
wherein a blade accommodation space is provided between the cover member and the first surface of the shutter base member, and
wherein the braking member is arranged in the blade accommodation space.

6. The focal-plane shutter according to claim 1,
wherein the blade group has a leading blade group which closes an opening part formed on the shutter base member before exposing and a trailing blade group which closes the opening part when completing an exposure,
wherein the blade driving member has a leading blade driving member which rotates along with the leading blade group and a trailing blade driving member which rotates along with the trailing blade group,
wherein the charge member has a leading blade cam gear which drives the leading blade driving member and a trailing blade cam gear which drives the trailing blade driving member, and
wherein the focal-plane shutter further comprises an idle gear which couples the leading blade cam gear with the trailing blade cam gear.

7. The focal-plane shutter according to claim 1, further comprising:
a driving spring configured to urge the blade driving member so as to drive the blade group from the standby position to the travelling completed position;
an adjuster where a fixed end of the driving spring is hooked and configured to adjust an urging force of the driving spring; and
an electric magnet configured to hold the blade driving member against the urging force of the driving spring,
wherein the adjuster has a first barrier which is circular arc shape and is positioned between the coil portion of the driving spring and the electric magnet.

8. The focal-plane shutter according to claim 7, wherein the blade driving member has a second barrier which protrudes toward the rotational center of the blade driving member.

9. The focal-plane shutter according to claim 8, further comprising:
an armature configured to attract the electric magnet,
wherein the second barrier is positioned between the armature and the first cam follower.

10. The focal-plane shutter according to claim 8, wherein a gap between the first barrier and the second barrier is from 0.1 mm to 0.6 mm.

11. The focal-plane shutter according to claim 10, further comprising:
an armature configured to attract the electric magnet,
wherein the second barrier is positioned between the armature and the first cam follower.

12. An image-pickup apparatus comprising:
an image-pickup element configured to generate image information by photoelectrically converting an object image;
at least one blade group;
a shutter base member including a first surface on which the blade group is arranged and a second surface, which is a back side of the first surface;
a blade driving member configured to drive the blade group between a standby position and a travelling completed position; and
a braking member arranged on the first surface,
wherein the blade driving member is rotatably arranged on the second surface of the shutter base member and includes a protruding portion arranged on the first surface through the shutter base member, and wherein in a case where the blade group is driven from the standby position to the travelling completed position, the braking member abuts the protruding portion arranged on the first surface.

* * * * *